Jan. 9, 1962 R. B. KALBACH 3,016,446
HEATING APPLIANCE
Filed Nov. 28, 1958 2 Sheets-Sheet 2
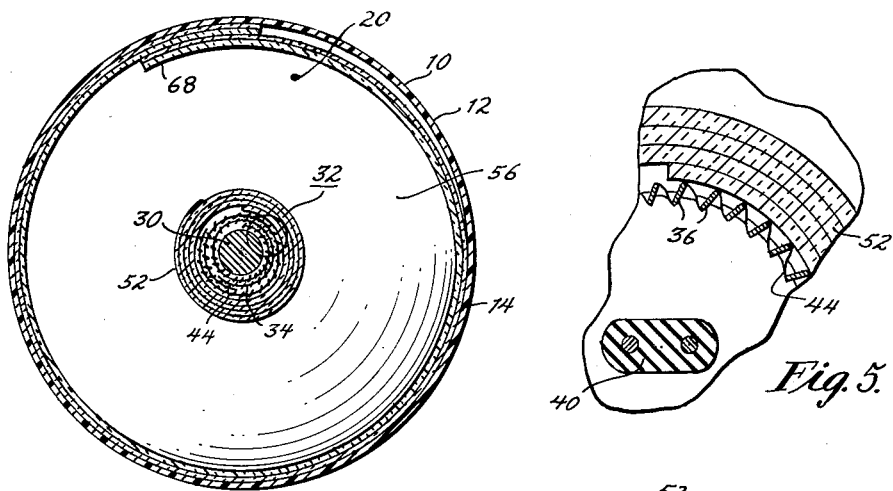
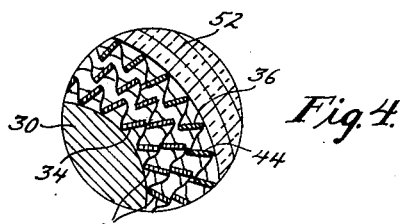
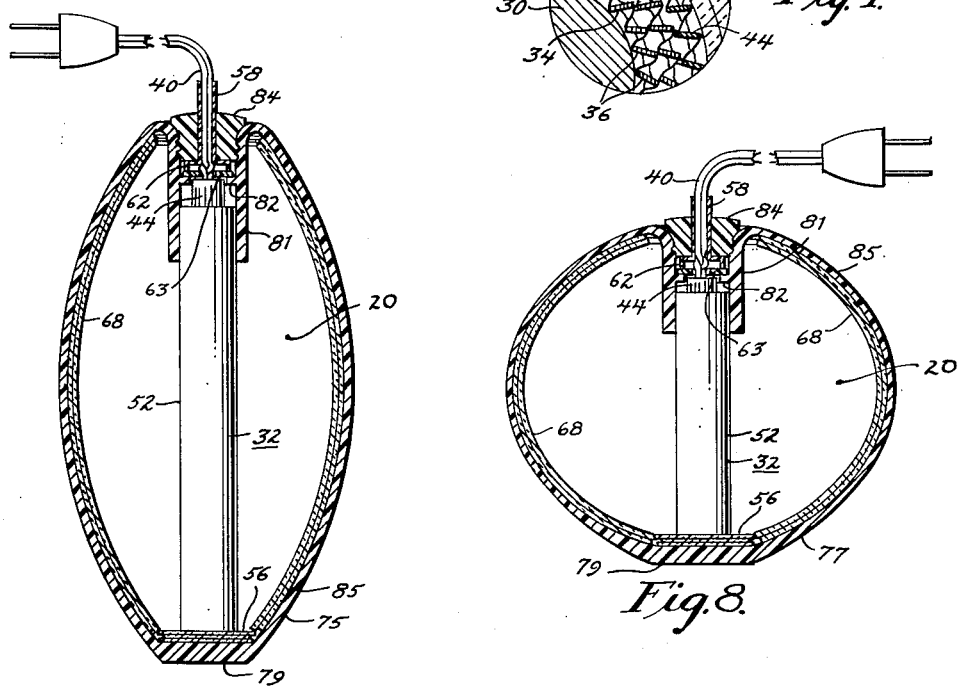
INVENTOR.
RAYMOND B. KALBACH
BY
ATTORNEY

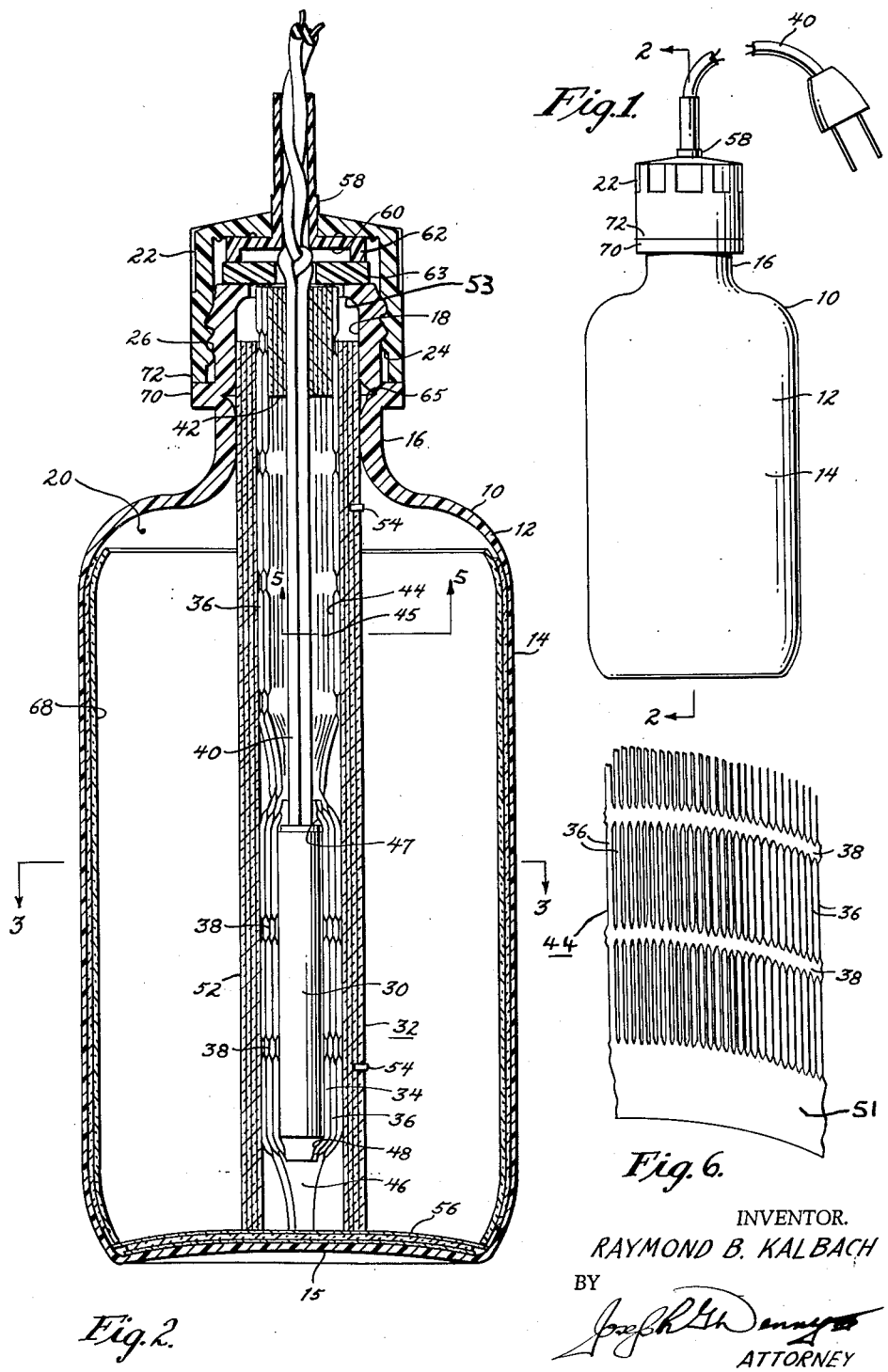

3,016,446
HEATING APPLIANCE
Raymond B. Kalbach, Bourse Bldg., 4th and Market Sts.,
Philadelphia, Pa.
Filed Nov. 28, 1958, Ser. No. 776,806
11 Claims. (Cl. 219—46)

My invention relates to an electrical heating appliance or heating bottle for supplying heat energy to various portions of the body and particularly to a small and compact heating bottle that does not utilize water or other liquids.

Heretofore, some heating appliances have been constructed of solid materials or have been large and bulky. It is an object of my invention to provide a heating appliance that may be conveniently handled and that is deformable to the approximate contour of the body at the zone to be treated.

Another object of my invention is to provide a heating appliance which becomes more flexible and more deformable upon its being heated and while in use without attaining a permanent deformation.

A further object of my invention is to provide a heater and an arrangement including a heat distributor inside the heating appliance that will heat the side walls of the appliance substantially uniformly but will not deteriorate the vessel comprising the heating appliance.

Another object is to provide a construction for centering the heat distributor within the vessel that requires a minimum of parts.

A still further object is to form the vessel from a material which will flex substantially when suitably manipulated by the user after becoming fully heated for providing heat to the portion of the body being exercised by manipulating the device.

Yet another object is to increase the uniformity of heat transfer within the vessel by forming the vessel of a material that is initially somewhat flexible and that becomes more so upon heating to allow flexing of the vessel and simultaneous disturbance of the air within the vessel during the period prior to attaining maximum heat for expediting the heat transfer.

In one embodiment of my invention the heating appliance comprises a generally cylindrical vessel of plastic material having a restricted neck providing an opening into the interior thereof and to which is secured a closure and a bottom end wall. The bottom wall and the cylindrical wall of the vessel are provided with insulating material. A heat distributor and an electrical heater are positioned in the center of the vessel.

The heater is fixedly secured to one portion of the heat distributor. The heat distributor is coaxial with the vessel and is restrained from lateral movement by the neck of the vessel.

When the heater is energized, the bottle becomes heated and the material forming the vessel is such that it becomes more flexible upon heating. The user may then deform the vessel to the approximate contour of the body at the zone to be treated.

The foregoing and other objects of my invention, the principles of my invention, and the best modes in which I have contemplated applying such principles will more fully appear from the following description and accompanying drawings in illustration thereof.

In the drawings FIG. 1 is a side elevation of my heating appliance;

FIG. 2 is a longitudinal sectional view of my heating appliance taken along the line 2—2 of FIG. 1;

FIG. 3 is a cross-sectional view taken along the line 3—3 of FIG. 2;

FIG. 4 is an enlargement of the central portion of FIG. 3 that is encircled;

FIG. 5 is a fragmentary cross-sectional view taken along the line 5—5 of FIG. 2 certain parts being omitted for clarity;

FIG. 6 is a fragmentary perspective enlargement of a bottom curved portion of a grid prior to assembly with the other components;

FIG. 7 is a view partly in section and partly in elevation illustrating a second embodiment of my invention; and FIG. 8 is a view similar to FIG. 7 but illustrating a third embodiment of my invention.

Referring to the drawings in detail there is illustrated a heating appliance or heating bottle 10 comprising a plastic vessel 12 having a cylindrical body 14, a bottom end wall 15, and a tapering top wall or restricted neck 16 forming an opening 18 into the interior or chamber 20 thereof. The vessel 12 is made from a plastic material such as polyethylene and has a wall thickness such that it has some flexibility initially but upon heating becomes more easily deformable and flexible without retaining permanent deformation upon cooling so that it returns to the shape it had before heating. The opening 18 is restricted by a plastic closure 22 having threads 24 on its inner peripheral cylindrical wall that cooperate with threads 26 on the outer peripheral wall of the neck 16.

The vessel 12 encloses a cylindrical elongated electrical heater 30 disposed or housed within a heat distributor 32. The heater 30 is preferably of the sheathed type, comprising a resistor (not illustrated) embedded in a suitable insulating material (not illustrated) and housed in a rigid metallic sheath.

The wattage of the heater 30 is such that heat is supplied to the vessel 12 at a rate below that which would cause permanent injury or deterioration of the vessel 12 but nevertheless increases its temperature sufficiently to increase its deformability and flexibility, as previously mentioned.

The heat distributor 32 includes a grid 34 tightly wrapped around the heater 30. The grid 34 comprises a plurality of layers of thin sheet metal formed from one piece that is tightly wrapped about the heater several times and longitudinally extends somewhat beyond the ends of the heater.

The grid 34 has perforations stamped therein formed by longitudinal banks of radially directed spokes or ribs 36 turned at an angle to the sheet metal and interconnected by bridging members 38 for convecting and radiating the heat of the heater radially outwardly and conducting the heat axially. As illustrated in FIG. 4, some of the ribs 36 of one layer contact those of the other layers in a radial direction. In the background of FIG. 2, the ribs 36 are shown only diagrammatically. To facilitate the heat conduction and to expedite its wrapping about the heater a thin aluminum sheet is formed into the grid 34.

The heater 30 is provided with a conducting cord 40 having suitable conductors for supplying the heater 30 with electrical energy. The cord 40 extends upwardly, as illustrated in FIG. 2, through the central portion or chamber of the heat distributor and passes through a central opening in the closure 22, the cord having an end portion (FIG. 1) suitable for connection to a source of electrical energy.

To a portion of the cord 40, adjacent the neck 16, is secured an insulator 42. Wrapped tightly about the grid 34 and the insulator 42 and extending from below the heater to slightly beyond the upper portion of the insulator 42 is a second or outer grid 44 of similar construction to the grid 34. The grid 44 forms a central vertical passage 45 between the heater 30 and the insulator 42 and a space 46 below the heater. The outer grid 44 and the inner grid 34 are permanently deformed, as illustrated, above and below the heater 30, at 47 and 48 to prevent axial movement of the heater upwardly and downwardly, respectively, relative to the grids 44 and 34.

A curved lower portion of the grid 44 is illustrated in perspective in FIG. 6 prior to assembly with the other components. The grid 44 varies from the grid 34 only in that the grid 44 has a lower portion 51 that is of solid sheet metal (does not have ribs) for increased strength to better support the weight of the heat distributor 32.

About the outer grid 44 is wrapped several times, as illustrated four times, a flexible insulating cloth 52 such as silicone rubber coated glass fabric. A silicone rubber coated glass fabric is preferred because no offensive odor is liberated when the heater is energized and heated. The cloth 52 may be stapled to retain its cylindrical shape by suitable staples 54, as illustrated.

The heat distributor 32 rests upon several layers of flexible insulating cloths 56 which, as illustrated, may be of different thickness and may also be of silicone rubber coated glass fabric.

The cord is knotted between the closure 22 and the insulator 42 and when the closure is fully screwed down upon the neck, the knot is disposed between the insulator and the closure. Where the cord 40 passes through the closure 22 a tubular member 58 is secured to the closure 22, encompassing the cord 40 and reinforcing it. The tubular member 58 is provided with a horizontal flange 60 having a depending annular rim 62, the flange 60 and rim 62 being carried downwardly when the closure is screwed down upon the neck 16. Seated upon the end wall of the neck is a washer 63 having a central opening through which the cord passes. The washer 63 is biased by the rim 62 adjacent the upper end portion of the grid 44 for restricting its upward longitudinal movement, the downward movement of the grid 44 being restricted by the cloths 56 and the end wall 15.

The outside diameter of the heat distributor 32, that is, of the cloths 52, is made slightly larger than the diameter of the opening 18. Thus, the heat distributor is insertable into the vessel 12 through and fits snugly within the opening 18, the lip 53 being sufficiently flexible and deformable to allow the heat distributor to enter the chamber 20. The heat distributor is restrained from lateral movement by the neck which is made of substantial length, as illustrated, so that a sufficiently large bearing surface against the cloths 52 is provided. If desired, the neck may be formed with an annular cavity 65 to prevent the neck from becoming heated at a rate faster than that of the other portions of the container.

To insure that the cylindrical body 14 is uniformly heated, the inner surface thereof may be lined with several layers of flexible insulating cloths 68, two layers being shown, which may also be silicone rubber coated glass cloths and of different thicknesses.

The insulating cloths 68 and 56 lining the cylindrical body 14 and the end wall 15, respectively, need not adhere thereto as long as they have enough body or rigidity to stay in position. They must, however, be flexible enough to permit them to deform upon the deformation of the vessel 12 by the user.

If desired, the neck 16 may be provided with an annular radial shoulder 70 against which an end portion of the closure 22 is seated when the closure is fully screwed down upon the neck. If a permanent seal is desired, a suitable adhesive, such as, in the case of polyethylene, a liquid plastic mixed with metal millings can be used.

When it is desired to utilize the heating appliance, the electrical cord is connected to a suitable source of electrical energy. The heater begins to heat and its heat is transmitted to the grids 34 and 44 by conduction, since the grids are in contact with each other and the grid 34 is in contact with the heater. Furthermore, heat is transmitted radially outwardly by convection between the radial spokes 36.

Heat also rises in the vertical passage 45 and then moves radially outwardly between the radial spokes. The insulating cloth 52 is thus heated and eventually the cloths 68 are heated until the cylindrical body 14 of the vessel 12 reaches a substantially uniform temperature.

The heating process may be materially expedited if, during the heating, the cylindrical body 14 of the vessel is flexed by the user. It is believed that this flexing agitates the air within the vessel and stimulates the transfer of heat between the heat distributor and the walls thereof.

As the plastic material of the vessel 12 increases in temperature it becomes more flexible. Upon attaining the maximum desired temperature, as determined by the wattage of the heater 30, the vessel becomes sufficiently deformable and flexible so that the cylindrical walls may be deformed to the approximate shape or contour of the body at the zone to be treated. The wattage of the heater is such that the vessel will not be heated to the level where the vessel will deteriorate from heat or incur a permanent deformation. Preferably the wattage should be in the range of 4 to 10 watts. No matter how much the vessel is flexed, however, its walls can never be made to contact the heater or the grids because of the various insulating cloths utilized. Furthermore, upon de-energization of the heater, the vessel cools and becomes more rigid than while heated without permanent deformation, returning to the shape it had prior to energization of the heater.

The embodiments illustrated in FIGS. 7 and 8 are generally similar to the first embodiment and the same reference numerals have been utilized for similar parts in FIGS. 7 and 8. The heat distributors 32 have, however, been shown in elevation so that the major portions of the grids 44 are not illustrated and neither are the grids 34 and the heaters 30.

The embodiment illustrated in FIG. 7 has a vessel 75 that has a generally ellipsoidal shape having an approximately elliptical or football shape in vertical section but circular in cross section (not illustrated) and the embodiment illustrated in FIG. 8 has a vessel 77 that is spheroidal or earth-like in shape. The vessels 75 and 77, in FIGS. 7 and 8, are provided with a flat bottom portion 79 so that they may be conveniently stored erect when not in use and for supporting the cloths 56 and the heat distributors 32. Also, the bottom portions 79 have greater thicknesses than the thicknesses of the side walls of the vessels 75 and 77 so that the heating of the bottom portions 79 does not become excessive.

Necks 81 are provided extending inwardly into the interior of the vessels. The necks are provided with radially inwardly extending shoulders 82 upon which rest washers 63 for restricting upward movement of the heat distributor 32. The tubular members 58 are provided with flanges 60 and annular rims 62 for securing the washer against the shoulders 82. The shoulders 82 are sufficiently flexible and deformable to allow the heat distributors to enter the chambers 20.

The closures, however, are provided with outer threads engaging threads on the inner periphery of the neck. The closures have an upper surface 84 such that when they are screwed fully downwardly until the rims 62 engage the washers 63 a substantially smooth continuous contour with the outer surfaces 85 is achieved at the top of the vessels facilitating use of the devices at the zone of the closures and providing a pleasing, uniform surface appearance.

The ellipsoidal shape of the vessel 75 makes it adaptable for use in areas of the body where the cylindrical shape of the vessel 12 of the first embodiment would be cumbersome and awkward.

The spheroidal shape of the vessel 77 makes it adaptable for use in the palm since the natural shape of the palm is cup-shaped. Also, in the arm pit the spheroidal shape would fit more comfortably than the other embodiments of my invention.

Since the heater 30 in each of the three embodiments is located near the bottom wall 15 (FIG. 2) or the bottom portions 79 (FIGS. 7 and 8) and there is no insulating cloth between each of the heaters 30 and the cloths 56, such as the cloth 52 or an insulator equivalent to the insulator 42, the heat from the heaters 30 will impinge radiantly upon the portions of each of the cloths 56 directly below each of the heaters 30. Thus, localized areas of increased heat are provided directly below the heaters in the central portions of the wall 15 and the bottom portions 79.

It is to be understood that the embodiment illustrated in FIGS. 7 and 8 may be formed with a projecting neck, such as used in the form shown in FIGS. 1 and 2. Likewise the form illustrated in FIGS. 1 and 2 may have an inverted neck similar to those shown in FIGS. 7 and 8.

Having described my invention, I claim:

1. A heating appliance comprising a vessel, a centrally located elongated heat distributor having a chamber, and an elongated heater in said chamber and enclosed by a portion of said distributor, said distributor comprising a sheet metal member having an annular array of longitudinal ribs radially disposed in cross section whereby the heat from the heater is directed along the longitudinal axis of the distributor and radially thereof, and an insulating means enveloping said sheet metal member, adjacent ribs forming openings communicating between the chamber and the insulating means.

2. A heating appliance comprising a vessel formed of a plastic material that is of increased deformability upon heating, said vessel having thin pliable walls defining a chamber, a heat distributor centrally located in said chamber, a heater enclosed by said heat distributor, said heat distributor comprising a metallic cylinder housing said heater, said metallic cylinder having a length extending beyond said heater, said metallic cylinder including longitudinal ribs radially directed in cross section for directing the heat radially and an insulating member surrounding said metallic cylinder for spacing the latter from said walls, and an additional insulating member for insulating said major portion of said walls and aiding in the attainment of a uniform temperature in said walls.

3. A heating appliance comprising a vessel having walls defining an opening and an opposed wall, a closure for said opening, a longitudinally extending heat distributor insertable into said vessel through said opening, said heat distributor being restrained from lateral movement by the walls defining said opening, said heat distributor being restrained from longitudinal movement by said opposed wall and said closure, a longitudinally extending heater enclosed by said heat distributor, said distributor comprising a coaxial metallic cover enclosing said heater and extending beyond said heater at one end thereof, said heater being spaced from said opposed wall, said heat distributor restraining movement of said heater, said metallic cover comprising longitudinally spaced radially directed spokes whereby the heat from the heater is directed along the longitudinal axis of the distributor and radially thereof.

4. A heating appliance comprising a spheroidally shaped vessel formed of a plastic material that is of increased deformability upon heating, a heat distributor centrally located within said vessel, insulating means for spacing said heat distributor from said vessel; said heat distributor comprising a heater, and a metallic cylinder housing said heater, said metallic cylinder being longer than said heater, said metallic cylinder including openings for radiant passage of heat.

5. A heating appliance comprising a generally ellipsoidally shaped vessel formed of a plastic material that is of increased deformability upon heating, a heat distributor centrally located within said vessel, insulating means for spacing said heat distributor from said vessel; said heat distributor comprising a heater, and a metallic cylinder housing said heater, said metallic cylinder being longer than said heater, said metallic cylinder including openings for radiant passage of heat.

6. A heating appliance comprising a vessel formed of a plastic material that is of increased deformability upon heating but that does not retain permanent deformation upon cooling; said vessel having walls defining a chamber, one of said walls having an opening that is opposed to another of said walls, a closure for restricting said opening, a longitudinally extending heat distributor coaxial with said vessel, said heat distributor being restricted from lateral movement by the walls defining said opening, said heat distributor being restrained from longitudinal movement by said opposed wall in one direction, said closure restraining movement of said heat distributor in the opposite direction, a longitudinally extending electrical heater enclosed by said heat distributor, said distributor comprising a coaxial metallic cover enclosing said heater and extending beyond said heater at one end thereof, said metallic cover comprising longitudinally spaced generally radially directed spokes whereby the heat from the heater is directed along the longitudinal axis of the distributor and radially thereof, an insulating cloth surrounding said metallic cover for spacing the latter from said vessel, additional insulating cloths for insulating substantially all of the walls defining said chamber for aiding in attaining a uniform temperature in said walls.

7. A heating appliance comprising a vessel formed of a plastic material that is of increased deformability upon heating but that does not retain permanent deformation upon cooling; said vessel having walls defining a chamber, one of said walls having an opening that is opposed to another of said walls, a closure for restricting said opening, a longitudinally extending heat distributor insertable into said vessel through said opening coaxial with said vessel, said heat distributor being restricted from lateral movement by the walls defining said opening, said heat distributor being restrained from longitudinal movement by said opposed wall in one direction, a washer for restraining movement of said heat distributor in the opposite direction, said washer resting upon said walls defining said opening, said closure biasing said washer against said walls defining said opening, a longitudinally extending electrical heater enclosed by said heat distributor, a cord including conductors extending from said heater through an opening in said closure, said distributor comprising a coaxial metallic cover enclosing said heater and extending beyond said heater at one end thereof, said metallic cover comprising longitudinally spaced banks of generally radially directed spokes whereby the heat from the heater is directed along the longitudinal axis of the distributor and radially thereof, an insulating cloth surrounding said metallic cover for spacing the latter from said vessel, additional insulating cloths for insulating substantially all of the walls defining said chamber and aiding in the attainment of a uniform temperature in said walls.

8. In a heating appliance of the character described the combination comprising an elongated vessel, a coaxial elongated radiant heat distributor, an elongated heater enclosed by said distributor, said distributor having a member for conducting the heat energy from the heater along a longitudinal axis of the distributor, said member having opposite portions extending beyond said heater and abutting portions of said vessel, and said extending portions of said member defining spaces for the passage of radiant heat energy to impinge upon the abutting portions of said vessel.

9. A heating appliance comprising a closed vessel, a coaxial elongated radiant heat distributor, an elongated heater enclosed by a portion of said distributor, said distributor having a metallic member for conducting heat energy from the heater along the longitudinal axis of the distributor and said metallic member having longitudinal ribs forming longitudinal openings for radiating and convecting heat energy radially outwardly thereof.

10. A heating appliance comprising a generally spheroidally shaped vessel formed of a plastic material that is of increased deformability upon heating, a heat distributor centrally located within said vessel, insulating means for spacing said heat distributor from said vessel, said heat distributor comprising a heater and a heat conducting cylinder housing said heater, said heat conducting cylinder being longer than said heater, said cylinder including openings for the radiant and convection passage of heat and longitudinally extending ribs radially disposed in cross section, and said openings being defined by adjacent ribs.

11. A heating appliance comprising a generally ellipsoidally shaped vessel formed of a plastic material that is of increased deformability upon heating, a heat distributor centrally located within said vessel, insulating means for spacing said heat distributor from said vessel, said heat distributor comprising a heater and a heat conducting cylinder housing said heater, said heat conducting cylinder being longer than said heater, said heat conducting cylinder including openings for the radiant and convection passage of heat, and longitudinally extending ribs radially disposed in cross section, and said openings being defined by adjacent ribs.

References Cited in the file of this patent
UNITED STATES PATENTS

| | | |
|---|---|---|
| 840,060 | Hill | Jan. 1, 1907 |
| 1,308,023 | Abtmeyer | July 1, 1919 |
| 1,997,844 | Weigand | Apr. 16, 1935 |
| 2,114,396 | McFarlan et al. | Apr. 19, 1938 |
| 2,178,397 | Larkey | Oct. 31, 1939 |
| 2,209,430 | Turshin | July 30, 1940 |
| 2,378,772 | Hummel | June 19, 1945 |
| 2,411,677 | Christenson | Nov. 26, 1946 |
| 2,432,169 | Morgan et al. | Dec. 9, 1947 |
| 2,554,745 | Kapsch | May 29, 1951 |
| 2,853,076 | Sumner | Sept. 23, 1958 |
| 2,855,968 | O'Malley | Oct. 14, 1958 |